United States Patent
Kavunder et al.

(10) Patent No.: US 9,661,522 B2
(45) Date of Patent: May 23, 2017

(54) SYSTEM AND METHOD ASSOCIATED WITH A SERVICE FLOW ROUTER

(71) Applicants: Arun Kavunder, Wilmington, MA (US); Rajeev Koodli, Saratoga, CA (US)

(72) Inventors: Arun Kavunder, Wilmington, MA (US); Rajeev Koodli, Saratoga, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 95 days.

(21) Appl. No.: 13/690,990

(22) Filed: Nov. 30, 2012

(65) Prior Publication Data

US 2014/0010085 A1 Jan. 9, 2014

Related U.S. Application Data

(60) Provisional application No. 61/669,245, filed on Jul. 9, 2012.

(51) Int. Cl.
*H04L 1/00* (2006.01)
*H04W 28/02* (2009.01)
(Continued)

(52) U.S. Cl.
CPC ......... *H04W 28/0215* (2013.01); *H04L 12/14* (2013.01); *H04L 41/0896* (2013.01);
(Continued)

(58) Field of Classification Search
CPC ....... H04W 8/18; H04W 28/08; H04W 88/16; H04W 76/022; H04W 28/0215;
(Continued)

(56) References Cited

U.S. PATENT DOCUMENTS 7,489,936 B1 2/2009 Liu
7,817,615 B1 10/2010 Breau et al.
(Continued)

FOREIGN PATENT DOCUMENTS

EP 1843530 10/2007
EP 2187665 5/2010
(Continued)

OTHER PUBLICATIONS

U.S. Appl. No. 13/330,332, filed Dec. 19, 2011, entitled "System and Method for Resource Management for Operator Services and Internet," Inventors: Rajeev Koodli, et al.
(Continued)

*Primary Examiner* — Kwang B Yao
*Assistant Examiner* — Harun Chowdhury
(74) *Attorney, Agent, or Firm* — Patent Capital Group

(57) ABSTRACT

A method is provided in one example embodiment and includes configuring a network element for subscriber-specific service chaining and traffic steering, where the configuring includes programming a selected service flow router user plane element with a subscriber context corresponding to a subscriber's session at a subscriber termination function. The subscriber context comprises instructions to steer subscriber traffic through a plurality of services in a network environment.

21 Claims, 5 Drawing Sheets

(51) Int. Cl.
  *H04L 12/14* (2006.01)
  *H04W 8/18* (2009.01)
  *H04W 28/08* (2009.01)
  *H04L 12/24* (2006.01)
  *H04W 88/16* (2009.01)

(52) U.S. Cl.
  CPC ............. *H04W 8/18* (2013.01); *H04W 28/08* (2013.01); *H04W 88/16* (2013.01)

(58) Field of Classification Search
  CPC ... H04L 12/14; H04L 12/1467; H04L 47/125; H04L 63/0209; H04L 41/0896
  USPC .......................... 370/230, 329, 338, 401, 235
  See application file for complete search history.

(56) References Cited

U.S. PATENT DOCUMENTS

| | | | |
|---|---|---|---|
| 8,560,693 B1* | 10/2013 | Wang ................. | H04L 12/4625 709/201 |
| 9,137,171 B2 | 9/2015 | Koodli et al. | |
| 9,210,728 B2 | 12/2015 | Koodli et al. | |
| 9,408,177 B2 | 8/2016 | Koodli et al. | |
| 2002/0089952 A1 | 7/2002 | Cao et al. | |
| 2003/0002637 A1 | 1/2003 | Miyauchi | |
| 2003/0145106 A1 | 7/2003 | Brown | |
| 2005/0195949 A1* | 9/2005 | Frattura ............. | H04M 3/4872 379/88.17 |
| 2005/0210154 A1 | 9/2005 | Verma et al. | |
| 2005/0259613 A1 | 11/2005 | Garudadri | |
| 2006/0128384 A1 | 6/2006 | Jagadeesan et al. | |
| 2006/0171314 A1 | 8/2006 | Qian et al. | |
| 2006/0251104 A1 | 11/2006 | Koga | |
| 2007/0025297 A1 | 2/2007 | Lee et al. | |
| 2007/0053370 A1* | 3/2007 | Aghvami et al. ............. | 370/401 |
| 2007/0264969 A1 | 11/2007 | Frank et al. | |
| 2008/0031188 A1 | 2/2008 | Magnusson et al. | |
| 2008/0032713 A1 | 2/2008 | Yang | |
| 2008/0056210 A1 | 3/2008 | Yaqub | |
| 2008/0181147 A1 | 7/2008 | Rydnell et al. | |
| 2008/0280612 A1 | 11/2008 | Bornier et al. | |
| 2009/0016292 A1* | 1/2009 | Viswanath et al. ........... | 370/329 |
| 2009/0016344 A1 | 1/2009 | Hu et al. | |
| 2009/0103491 A1 | 4/2009 | Zuniga et al. | |
| 2009/0168692 A1 | 7/2009 | Chen | |
| 2009/0232091 A1 | 9/2009 | Khan | |
| 2009/0245202 A1 | 10/2009 | Gras et al. | |
| 2009/0259736 A1 | 10/2009 | Chang et al. | |
| 2009/0293106 A1 | 11/2009 | Gray et al. | |
| 2010/0046369 A1 | 2/2010 | Zhao et al. | |
| 2010/0056152 A1 | 3/2010 | Penhoat et al. | |
| 2010/0075698 A1 | 3/2010 | Rune et al. | |
| 2010/0085884 A1 | 4/2010 | Srinivasan et al. | |
| 2010/0220680 A1 | 9/2010 | Ramankutty et al. | |
| 2011/0075557 A1 | 3/2011 | Chowdhury et al. | |
| 2011/0103310 A1 | 5/2011 | Stojanovski et al. | |
| 2011/0106709 A1 | 5/2011 | Puura et al. | |
| 2011/0202641 A1* | 8/2011 | Kahn et al. .................... | 709/221 |
| 2011/0222399 A1* | 9/2011 | Shi et al. ...................... | 370/230 |
| 2011/0225309 A1 | 9/2011 | Riley | |
| 2011/0263258 A1 | 10/2011 | Soliman et al. | |
| 2011/0286437 A1 | 11/2011 | Austin | |
| 2012/0008525 A1 | 1/2012 | Koskinen | |
| 2012/0079559 A1 | 3/2012 | Reznik et al. | |
| 2012/0127974 A1 | 5/2012 | Doppler et al. | |
| 2012/0142352 A1 | 6/2012 | Zhang et al. | |
| 2012/0207174 A1* | 8/2012 | Shieh ................... | H04L 47/125 370/401 |
| 2012/0213072 A1 | 8/2012 | Kotecha et al. | |
| 2012/0302244 A1 | 11/2012 | Sridhar et al. | |
| 2013/0095806 A1 | 4/2013 | Salkintzis et al. | |
| 2013/0122921 A1 | 5/2013 | Juppi et al. | |
| 2013/0326058 A1 | 12/2013 | Brady et al. | |
| 2014/0105129 A1 | 4/2014 | Chen | |
| 2014/0146802 A1* | 5/2014 | Kutt et al. .................... | 370/338 |
| 2014/0148129 A1 | 5/2014 | Lundstrom | |
| 2014/0369198 A1 | 12/2014 | Rinne et al. | |

FOREIGN PATENT DOCUMENTS

| | | |
|---|---|---|
| EP | 2608457 | 6/2013 |
| EP | 2608458 | 6/2013 |
| EP | 2608617 | 6/2013 |
| EP | 2665318 | 11/2013 |

OTHER PUBLICATIONS

U.S. Appl. No. 13/369,373, filed Feb. 9, 2012, entitled "System and Method for Resource Management for Operator Services and Internet," Inventors: Rajeev Koodli, et al.
U.S. Appl. No. 13/330,464, filed Dec. 19, 2011, entitled "System and Method for Resource Management for Operator Services and Internet," Inventors: Rajeev Koodli.
U.S. Appl. No. 13/472,306, filed May 15, 2012, entitled "System and Method for Scoped Paging in Multi-Radio Heterogeneous Networks," Inventor: Rajeev Koodli.
USPTO Jul. 20, 2012 Non-Final Office Action from U.S. Appl. No. 13/472,306.
USPTO Oct. 18, 2012 Response to Jul. 20, 2012 Non-Final Office Action from U.S. Appl. No. 13/472,306.
Action Wireless Broadband Corp., "OD200 WiMAX 802.16e Outdoor CPE: The Cost-Effective Outdoor Solution for WiMAX Service Deployment," DS_OD2_V1.00, Jul. 2009, 2 pages; www.AWBnetworks.com.
"WiMAX Deployment," WiMAX Base Station Demo at GEC 6, Nov. 17, 2009, 28 pages; http://groups.geni.net/geni/wiki/WiMAXInteg.
USPTO Jun. 19, 2014 Non-Final Office Action from U.S. Appl. No. 13/330,332.
USPTO Jun. 25, 2014 Non-Final Office Action from U.S. Appl. No. 13/369,373.
USPTO Jun. 6, 2014 Non-Final Office Action from U.S. Appl. No. 13/330,464.
EPO Apr. 23, 2013 European Search Report and Opinion from European Patent Application No. 12159101.0; 5 pages.
3GPP TS 24.312 V11.0.0 (Sep. 2011) Technical Specification, "$3^{rd}$ Generation Partnership Project: Technical Specification Group Core Network and Terminals; Access Network Discovery and Selection Function (ANDSF) Management Object (MO) (Release 11)," 3GPP Standard, $3^{rd}$ Generational Partnership Project (3GPP), Mobile Competence Centre; 650 Route Des Lucioles; F-06921 Sophia-Antipolis Cedex, France; vol. Ct WG1 No. V11.0.0, Sep. 2011, 157 pages.
3GPP TS 23.402 V11.1.1 (Dec. 2011) Technical Specification, "$3^{rd}$ Generation Partnership Project; Technical Specification Group Services and System Aspects; Architecture Enhancements for non-3GPP accesses (Release 11)," 3GPP Draft; 23401-B10_CRS_Implemented, $3^{rd}$ Generational Partnership Project (3GPP), Mobile Competence Centre; 650 Route Des Lucioles; F-06921 Sophia-Antipolis Cedex; France; Dec. 2011; 232 pages.
USPTO Apr. 22, 2013 RCE Response to Final Office Action dated Jan. 31, 2013 from U.S. Appl. No. 13/472,306.
USPTO May 15, 2013 Notice of Allowance from U.S. Appl. No. 13/472,306.
U.S. Appl. No. 13/690,847, filed Nov. 30, 2012, entitled "System and Method Associated With a Service Flow Router" Inventor: Arun Kavunder.
USPTO Jan. 31, 2013 Final Office Action from U.S. Appl. No. 13/472,306.
USPTO Apr. 4, 2013 Non-Final Office Action from U.S. Appl. No. 13/330,332.
EPO Sep. 30, 2013 European Search Report and Written Opinion from European Patent Application No. 12195950.6; 13 pages.
USPTO Sep. 27, 2013 Final Office Action from U.S. Appl. No. 13/330,332.

(56) References Cited

OTHER PUBLICATIONS

USPTO Jan. 27, 2015 Non-Final Office Action from U.S. Appl. No. 13/330,332.
USPTO Jul. 16, 2014 Non-Final Office Action from U.S. Appl. No. 13/690,847.
USPTO Dec. 15, 2014 Final Office Action from U.S. Appl. No. 13/690,847.
USPTO Feb. 20, 2015 Final Office Action from U.S. Appl. No. 13/369,373.
USPTO Jun. 9, 2015 Notice of Allowance from U.S. Appl. No. 13/369,373.
USPTO Mar. 18, 2015 Non-Final Office Action from U.S. Appl. No. 13/330,464.
PRC Aug. 5, 2015 1st SIPO Office Action from Chinese Application Serial No. 20120518167.8.
USPTO Oct. 8, 2015 Final Office Action from U.S. Appl. No. 13/330,464.
EPO Aug. 7, 2015 European Search Report and Written Opinion from European Patent Application No. 12169630; 6 pages.
EPO Aug. 13, 2015 European Search Report and Written Opinion from European Patent Application No. 12159097; 6 pages.
USPTO Aug. 21, 2015 Notice of Allowance from U.S. Appl. No. 13/330,332.
USPTO Dec. 1, 2015 Non-Final Office Action from U.S. Appl. No. 13/690,847.
PRC Mar. 31, 2016 Second SIPO Office Action from Chinese Application Serial No. 20120518167.8.
USPTO May 2, 2016 Final Office Action from U.S. Appl. No. 13/690,847.
3GPP TS 23.234 V10.0.0 (Mar. 2011) Technical Specification: 3rd Generation Partnership Project; Technical Specification Group Services and System Aspects; 3GPP system to Wireless Local Area Network (WLAN) interworking; System description (Release 10); 3rd Generational Partnership Project (3GPP) , 650 Route Des Lucioles; F-06921 Sophia-Antipolis Cedex, France; Mar. 2011, 84 pages.

\* cited by examiner

SYSTEM AND METHOD ASSOCIATED WITH A SERVICE FLOW ROUTER

CROSS-REFERENCE TO RELATED APPLICATION

This application claims the benefit of priority under 35 U.S.C. §119(e) to U.S. Provisional Application Ser. No. 61/669,245, entitled "Subscriber-Aware Service Flow Router" filed Jul. 9, 2012, which is hereby incorporated by reference in its entirety.

TECHNICAL FIELD

This disclosure relates in general to the field of communications and, more particularly, to a system and a method associated with a service flow router.

BACKGROUND

Wireless communication technologies are used in connection with many applications involving laptop computers, cellular telephones, user equipment, tablets, etc. Wireless communication technologies are tasked with handling increased amounts of data traffic, where the types of data being transported through mobile wireless networks have changed dramatically. This is because of device sophistication, which fosters data-intensive activities such as displaying movies, playing video games, readily attaching photographs to e-mails and text messages, etc. Moreover, video file-sharing and other types of usages (more traditionally associated with wired networks) have been gradually displacing voice as the dominant traffic in mobile wireless networks. This data intensive content burdens the network, as bandwidth is a finite resource. There is a significant challenge for system architects and mobile operators to maintain a stable/reliable network environment and, further, to optimize network resources for engendering acceptable device performance for subscribers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
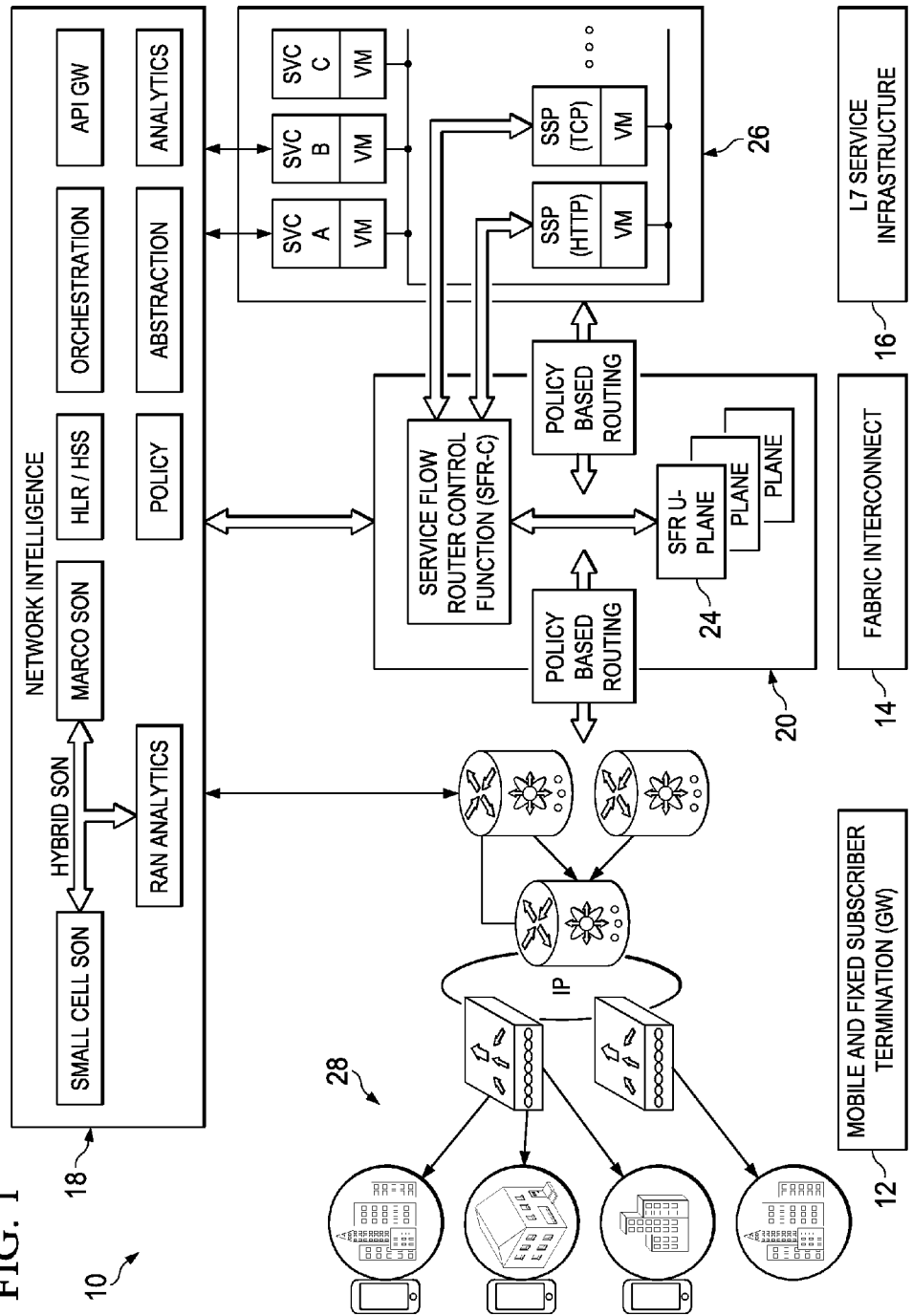
FIG. 1 is a simplified block diagram of a communication system associated with a service flow router in accordance with one embodiment of the present disclosure.

A method is provided in one example embodiment and includes configuring a network element for subscriber-specific service chaining and traffic steering, where the configuring can include programming a selected service flow router user plane element with a subscriber context corresponding to a subscriber's session at a subscriber termination function. The subscriber context comprises instructions to steer subscriber traffic through a plurality of services in a network environment.

In more particular embodiments, the selected service flow router user plane element can decode the subscriber context to determine an Internet protocol (IP) address for a plurality of service elements for steering the subscriber traffic based on load conditions at the plurality of service elements. The selected service flow router user plane element can manage a service steering operation by following an order of the plurality of service elements specified in the subscriber context. In other embodiments, the selected service flow router user plane element forwards incoming IP packets to a first service element in a service chain using a layer-2 (L2) or a layer-3 (L3) technology.

Certain implementations may further include receiving IP packets from the first service element; performing at least one accounting operation for an offered service; and identifying a next service element in the service chain specified in the subscriber context. Additionally, the selected service flow router user plane element can forward packets for the subscriber's session to a specific next-hop service element based on the instructions in the subscriber context such that the subscriber traffic is not forwarded to an Internet or to another service network. The selected service flow router user plane element exports accounting records for steered services based on the instructions in the subscriber context.

In other scenarios, the selected service flow router user plane element applies bandwidth limiting for the plurality of services in the service chain based on the instructions in the subscriber context. The selected service flow router user plane element updates the subscriber context once dynamically programmed by a service flow router control function after a modification of the subscriber's session at the subscriber termination function. Additionally, the selected service flow router user plane element exports accounting records for steered services based on the instructions in an updated subscriber context.

The selected service flow router user plane element removes the subscriber context after termination of the subscriber's session. In addition, the selected service flow router user plane element stops forwarding packets for an identified IP address for the subscriber's session after removal of the subscriber context.

In another embodiment, a method is provided that may include configuring a network element for load balancing based on input (any suitable information) provided by a mobile gateway. The configuring can include selecting an instance of a service flow router control function (SFR-C) at the network element based on an IP address assigned to a subscriber, where subscriber flow rules are provided to a service flow user plane of the network element. The method can also include selecting a subscriber service proxy (SSP) based on a particular load balancing criterion. The load balancing criterion can include any suitable information associated with the subscriber, the service to be provided, bandwidth characteristics, server capabilities, network congestion, packet loss, latency, processing issues generally (for user equipment, network equipment, etc.), or any other suitable information that may impact a load balancing decision. The forwarding plane of the network element can be configured based on the subscriber flow rules. A return message can be communicated to the SFR-C that includes a particular IP address of the selected SSP.

In more particular embodiments, the subscriber flow rules identify a service tuple, which includes an ordered list of services a subscriber flow is expected to traverse. Additionally, the SFR-C can obtain subscriber-specific information from a subscriber database. Additionally, the SFR-C may provide an IP address and radio access type (RAT) type associated with a subscriber session. The selected SSP can access a subscriber policy database to retrieve policy rules to apply to a subscriber session. The selected SSP can use subscriber session information to recreate L7 headers and to perform L7-specific traffic actions for subscriber traffic. In certain cases, the selected SSP modifies (e.g., adjusts, enriches, enhances, changes, etc.) a hypertext transfer protocol (HTTP) header with a Mobile Station International Subscriber Directory Number (MSISDN), which can be used for application-level authentication and for charging.

Additionally, the selected SSP can modify a particular header in order to affect certain content associated with a subscriber session and to enable bandwidth for the subscriber session based on a radio access technology associated with the subscriber session. Certain communications between the selected SSP and the SFR-C may be initiated on-demand by the selected SSP when a new session is created at the selected SSP. The selected SSP can be configured to load balance a target service executing on virtual machines based on a particular RAT type.

In more particular implementations, the SFR-C provides an International Mobile Station Equipment Identity (IMEI) type to the selected SSP such that the selected SSP can load balance a target service executing on virtual machines based on the IMEI type. The network element can be configured to forward particular traffic from a same subscriber or a same flow to a same load balancer, which previously handled the same subscriber or the same flow. The mobile gateway can select IP addresses for subscriber sessions such that the selected IP addresses enable loadbalancing across a plurality of SFR-C instances. The mobile gateway can assign IP addresses to distribute a load across a plurality of service flow user plane instances uniformly. The mobile gateway can send a plurality of packets to the SFR-C to provide subscriber-specific information associated with a plurality of subscriber IP addresses and charging rules.

Example Embodiments

Turning to FIG. 1, FIG. 1 is a simplified block diagram of a communication system 10 for providing a service flow router for Internet and operator services in accordance with one embodiment of the present disclosure. In a particular embodiment, the architecture of FIG. 1 can offer a scalable subscriber-specific service insertion and service chaining protocol for both L4 and L7 functions for upstream communications, downstream communications, and device-to-device communication. Other systems that fail to provide a single control for subscriber-aware service insertion and for chaining L4 and L7 elements. Additionally, the framework of FIG. 1 can (in certain embodiments) accommodate service insertion on a per-subscriber basis and provide service chaining on a per-subscriber basis (e.g., based on service profiles). In addition, the framework of FIG. 1 can offer separate upstream and downstream service chains that are independent of each other. Moreover, the architecture of FIG. 1 can span services across different locations without creating a tromboning effect in which packets are forced to shuttle back and forth across locations to the service steering device. Furthermore, the architecture of FIG. 1 can readily accommodate user equipment (UE)-to-UE traffic with appropriate service chaining in the correct order for each UE in each direction of the traffic flow.

Turning to the example infrastructure of FIG. 1, FIG. 1 may include a mobile and fixed subscriber termination gateway (GW) 12, a fabric interconnect 14, an L7 service infrastructure 16, a service flow router 20, which includes a control function (SFR-C) coupled to one or more SFR U-planes 24. Additionally, a number of endpoints 28 may also be provided in the architecture, along with network intelligence generally indicated by an arrow 18. Also provided in FIG. 1 are a number of subscriber service proxy (SSP) hypertext transfer protocol (HTTP) virtual machines (VMs) generally indicated at 26. Note that in certain example implementations, service flow router 20 may be consolidated with any one or more of the elements depicted generally at 26. Along similar lines, service flow router 20 and/or 26 may be provisioned in conjunction with any suitable mobile gateway. The mobile gateway, service flow router 20 and/or 26 may share one or more of the responsibilities associated with processing, intelligent subscriber-specific service insertion, and/or service chaining protocol activities discussed herein. Details associated with operations and activities associated with this infrastructure are provided below in the context of several examples that illustrate some of the capabilities of communication system 10.

In a particular implementation, the architecture of FIG. 1 may work in conjunction with local area network (LAN) access and a long-term evolution (LTE) service, which may include a backhaul. Additionally, communication system 10 may be associated with any type of wireless or wired communications, inclusive of small cell deployments, femto and/or pico cell deployments, any type of WiFi deployments, any type of 802.11 communication links, any type of cable access configurations, any type of broadband configurations, etc. Communication system 10 may include multiple instances of user equipment (UEs) and one or more WiFi wireless access points (WAPs), which collectively may form a wireless LAN (WLAN) (generally indicated at 28). In addition, in certain embodiments, the architecture of FIG. 1 may include a packet data gateway/serving gateway (PGW/SGW) that may be coupled to a home subscriber server (HSS), a charging gateway function online charging system, a policy and charging rules function (PCRF), and an access network delivery selection function (ANDSF). Communications between these elements may occur over any suitable interface, or over any suitable link, etc.

For purposes of illustrating certain example techniques of communication system 10, it is important to understand the typical communications that may be traversing the WiFi/cellular networks. The following foundational information may be viewed as a basis from which the present disclosure may be properly explained. The Service Provider (SP) industry is embracing virtualization and cloud computing concepts. In particular, SPs are looking to offer services that are independent of server hardware and network equipment. Additionally, there is a need to better meet demand-supply issues independent of geographical constraints. This transition is especially challenging in the Mobile Service Provider (MSP) networks because of the subscriber density and the associated scale of services, which need to be offered. Hence, many of the discussions outlined herein offer a solution associated with using the MSP networks as the representative environment for the problem.

One problem in the "MSP Cloud" is subscriber-aware service insertion and service steering. This involves a function that generates (inserts) subscriber-specific flow state and steers a subscriber flow through an arbitrary set of services based on the subscriber policy rules maintained by the MSP. The services themselves are not assumed to be subscriber-aware and are meant to run on virtualized server platforms for maximal utility and flexibility. The steering function should scale for a large number of subscriber flows, as well as services that can be distributed geographically across data centers.

Embodiments of the present disclosure can address any number of salient issues in the network. For example, the framework can be responsible for the generation of subscriber-specific flow rules, as a function of subscriber session creation at an MSP node (e.g., a mobile gateway). Additionally, certain embodiments of the present disclosure can centrally program the user-plane devices, as well as the server elements, with subscriber service logic.

The framework discussed during can also offer service steering for packets bound to the Internet using the subscriber's source IP address. It can also offer service steering for packets arriving from the Internet using the subscriber's destination IP address. It can also be responsible for generating consolidated L4 and L7 accounting records for the services offered, upon subscriber session termination. Furthermore, the architecture can also offer mid-session policy updates for both L4 and L7 subscriber session state. Additionally, the architecture can provide service steering for communication (peer-peer) traffic between two subscribers. Moreover, the architecture can provide IP address pool management for aggregation of flow state so that network nodes do not need to maintain per-IP state.

Figure 2:
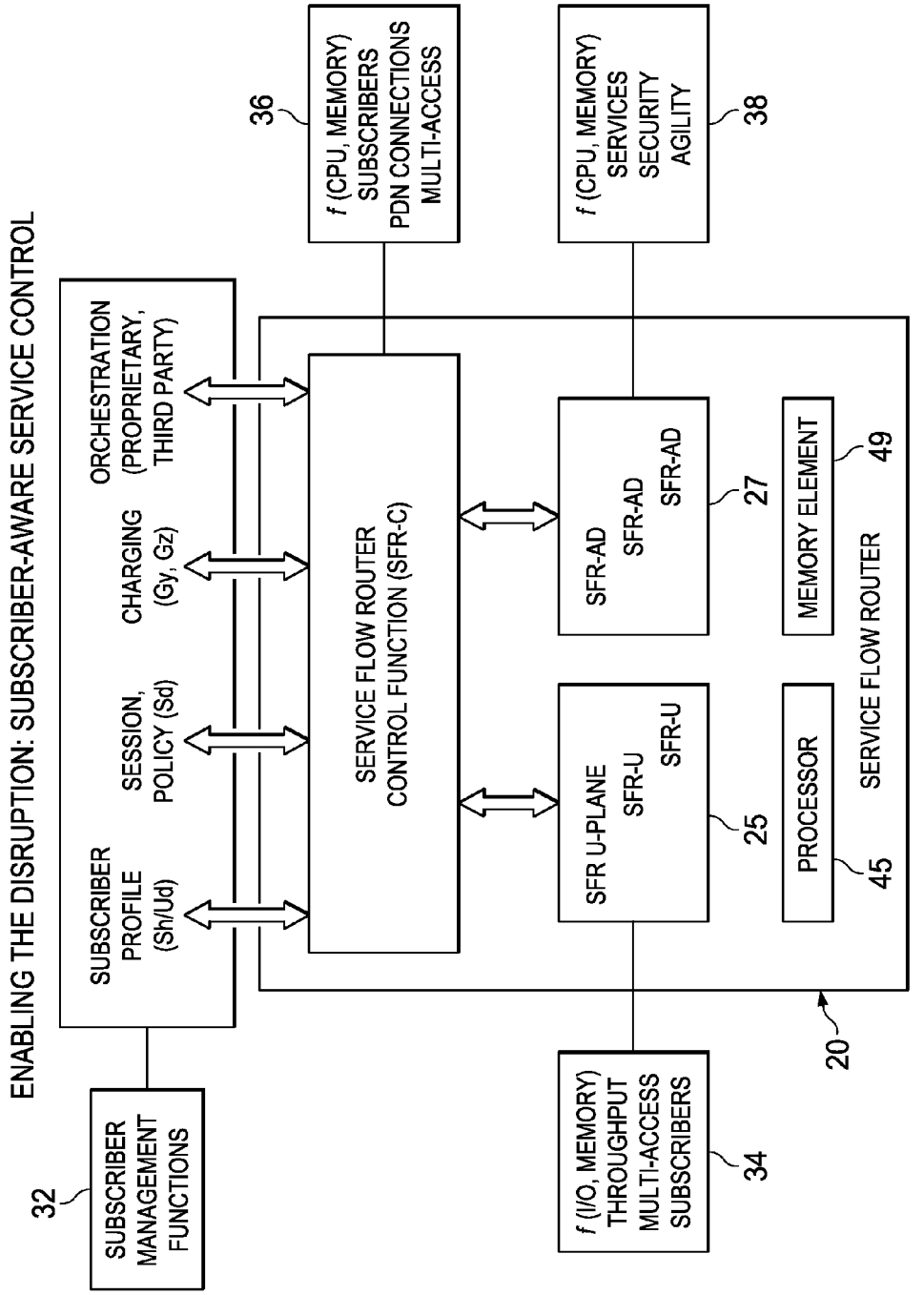
FIG. 2 is a simplified block diagram illustrating possible example details associated with the communication system.

Turning to FIG. 2, FIG. 2 is a simplified block diagram illustrating example details associated with one embodiment the present disclosure. In this particular example, a set of subscriber management functions 32 are being illustrated, along with an input/output (i/o), memory throughput instance 34 that is associated with multi-access subscribers. Also provided in FIG. 2 is a central processing unit (CPU), memory services security agility instance 38. Also provided in FIG. 2 is a CPU, memory subscribers PDN connections multi-access instance 36. In addition, service flow router 20 may include several instances of SFR-User (SFR-U) planes 25, a service flow router-application director (SFR-AD) 27, a processor 45, and a memory element 49. As used herein in this Specification, the terms 'SSP' and 'SFR-A' can refer to the same element of the architecture and, hence, their usage is interchangeable.

In operation, the SFR-C programs the SFR-U, as well as the subscriber service proxy (SSP), which can terminate the subscriber's transmission control protocol (TCP) or HTTP or other upper layer connection. Often, but not so limited, the SSP also contains the application load balancer function. The SFR-C takes input from a mobile gateway (or any other suitable nodes) at the time of subscriber session establishment, and programs the SFR-U function for service insertion and steering (e.g., potentially along with the SSP function for L7-specific functions such as the L7 header enrichment for authentication, charging, and other functions). The SFR-C takes input from a mobile gateway (or other suitable nodes) at the time of subscriber session teardown and deletes the appropriate state at the SFR-U and the SSP. Similarly, the SFR-C can perform any mid-session policy updates such as addition or deletion of one or more services for the subscriber flow, by programming the SFR-U and the SSP. When a subscriber session is terminated or updated, the SFR function can generate the appropriate accounting records for billing purposes.

UEs can be located in the access networks, such as a 3G/4G/WiFi Radio Access Network, and the services can be located in the services networks, commonly referred to as "Gi" or SGi" LAN in the MSP networks. The external networks can include the Internet, enterprise networks, etc. For purposes of this disclosure, access and external networks are also sometimes simply considered as different types of service networks. The SFR has designated ingress and egress interfaces for each service network type, and traffic from any service network type can be sent to a designated ingress interface on the SFR designated for that service type. Similarly, the traffic sent via the SFR to any service network can be sent out via the designated egress interface for that service type.

In a particular embodiment, the SFR-C is generally a centralized function. The SFR-U function can be distributed across multiple functional nodes or centralized in a single chassis. The SFR-C function can be centralized, while the SFR-U function can be geographically distributed across Data Centers. The SFR-C function can run in a virtualized server environment, the SFR-U function can run in forwarding plane elements and/or in X86 server nodes potentially with expedited packet processing functions. The SSP function can run in a virtualized server environment with multiple application services.

In a non-limiting embodiment, and without the loss of generality, certain descriptions provided herein use the mobile gateway as the representative node where a subscriber's broadband session is terminated. It should be noted that the SFR concept is applicable to any fixed broadband services equally. In a particular embodiment, the mobile gateway that terminates the subscriber's session selects IP addresses (IPv4 and IPv6) for the subscriber's session such that the selected addresses enable load balancing of subscriber flows across the various SFR-U elements. As one specific performance metric, the mobile gateway can assign IP addresses in order to distribute the load across various SFR-U elements uniformly.

In another particular embodiment, the mobile gateway is configured to send a special packet to the SFR-C providing the subscriber-specific information. The information includes the subscriber's IP address(es), IMSI, MSISDN, IMEI, Radio Access Type (RAT), APN, Charging Rules, and any other relevant parameters.

In another embodiment where the mobile gateway interface to the SFR-C is not feasible due to the particular deployment considerations, the SFR-C obtains the subscriber-specific information from an appropriate subscriber database maintained by the MSP. In such a deployment, the subscriber analytics information SEI may not be available, unless provided by other mechanisms. With the subscriber-specific information obtained, the SFR-C can program the SFR-U and the SSP. The sequence of events is as follows. First, the SFR-C selects an SFR-U based on the IP address assigned to the subscriber. This information is obtained in the steps 1 or 2 above. The SFR-C sends a message to the SFR-U providing the subscriber flow rules for the APN in question. The flow rules can identify the service tuple, which includes the ordered list of services the subscriber flow is expected to traverse. Second, the SFR-U, in turn, can select an SSP based on its own load-balancing criterion. The SFR-U programs its forwarding plane using the subscriber flow rules provided and returns a message back to the SFR-C containing the IP address of the chosen SSP. The SFR-C can also program the SFR-U with the selected SSP destination for the specific subscriber flow in a centralized manner.

Third, using the IP address provided by the SFR-U, the SFR-C communicates with the SSP. The SFR-C provides the subscriber session's IP address, MSISDN, IMEI and RAT type. In another embodiment, the SSP contacts the SFR-C for retrieving the subscriber session information rather than SFR-C communicating with the SSP as in the step above. Such communication may take place when the SSP encounters a new subscriber session. Fourth, depending on the MSP deployment model in use, the SSP may connect to the subscriber policy database to retrieve additional policy rules for the subscriber. Fifth, the SSP uses the subscriber session information to re-create L7 headers as well as perform any L7-specific traffic actions when the subscriber traffic arrives. As one specific instance, the SSP modifies (e.g., enriches) the HTTP header with the MSISDN, which is used for application-level authentication and charging RAT type that can be used to tailor content, enable bandwidth, etc., based on the radio access the subscriber session is attached to (e.g., SP WiFi, 3G, 4G, residential broadband, etc.). The IMEI can be used to tailor the content based on the device type.

Sixth, the SSP responds to SFR-C with an acknowledgement. As noted above, the communication between SSP and SFR-C may be initiated on-demand by the SSP at the time of a new session creation at the SSP. Seventh, the SFR-C responds to the mobile gateway (as a response to the steps above). At this time, the subscriber session is established at the mobile gateway, SFR-C, and SFR-C. The session is also established on the SSP. Eight, when the subscriber session is terminated, the mobile gateway sends a message to the SFR-C. The SFR-C deletes the subscriber flow state at the SFR-U and at the SSP. The SFR-C sends a message to the SFR-U to delete the subscriber flow state. The SFR-U sends the flow accounting records in acknowledgement. The SFR-C sends a message to the SSP to delete the L4-L7 flow state. The SSP sends the accounting records in acknowledgement. Ninth, and in a particular embodiment, the SFR-C performs the session teardown operation at the SFR-U and the SSP based on a trigger from any other appropriate node. Tenth, once a subscriber session is updated, the mobile gateway sends a message to the SFR-C containing the new attributes reflecting the update. For instance, the mobile gateway signals the new RAT type if the subscriber changes the access network. The SFR-C subsequently programs the SFR-U and SSP with the new attributes. Such an action could result in the SSP changing the L7 header for a server to change, for example, its encoding or transrating rate for video.

When a subscriber session state is updated, the SFR-U records the local accounting records with the updates and present timestamp. Additionally, when a subscriber session state is updated, the SSP records the local accounting records with the updates and present timestamp. In another embodiment, the SFR-C performs the mid-session update based on a trigger from any other appropriate node. In certain embodiments, the SSP registers a new application with the SFR-C using the communication channel between the SSP and the SFR-C. This registration information includes an appropriate XML schema describing the service as well as the IP address of the new SSP instance for communication. Similarly, the SSP de-registers an existing application when it is no longer in commission.

Figure 3:
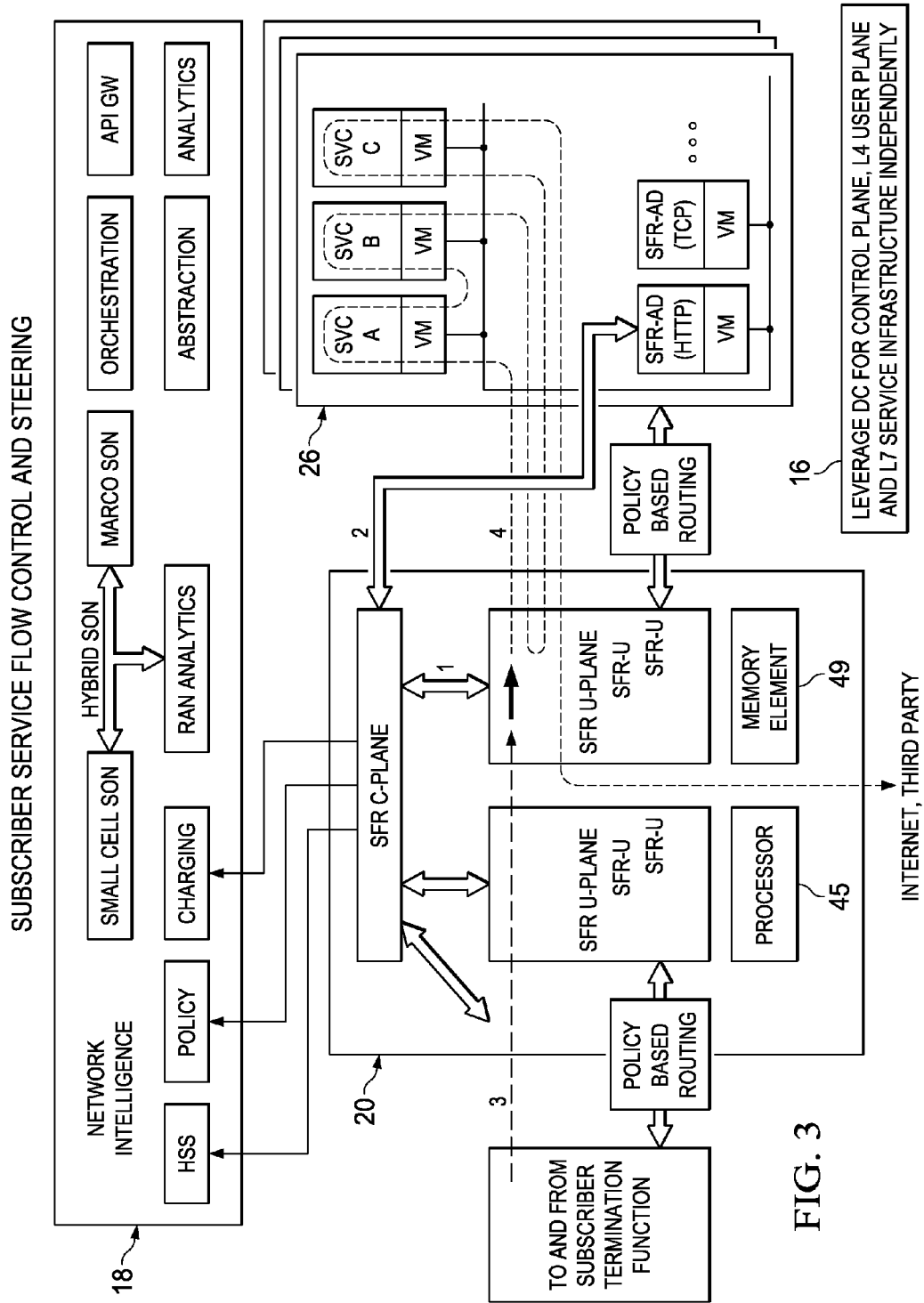
FIG. 3 is another simplified block diagram illustrating possible example details associated with the communication system.

FIG. 3 is a simplified block diagram illustrating potential details associated with the present disclosure. This particular example relates to a subscriber service flow control and steering activity. In operation, the SFR-U is a function that can be realized in a high-performance routing and/or switching fabric that connects a Subscriber Termination Device (e.g., a mobile gateway) and the Service Infrastructure (such as SGi LAN L3 to L7 service equipment). It can perform functions based on the programming controlled by the SFR-C. The SFR-U can also be realized on COTS servers either in bare metal mode or via VMs depending on the deployment model.

One of the functions performed by the SFR-U is service chaining. A service chain is an ordered list of L3 to L7 services that a particular flow is meant to traverse. The SFR-U maintains the flow tuple information as well as the ingress and egress interfaces that map to the L3 to L7 Service end-points in the chaining order. Upon packet arrival on a specific ingress interface, the SFR-U forwards the packet to the appropriate egress interface (L2, IP-hop) based on the SSP that is meant to service the packet. The SFR-U uses the service chain provided by the SFR-C and the knowledge of the SSPs to build the forwarding information. As a subset of the chaining operation, a Null chain implies that the SFR-U forwards the packet directly out to the Internet without steering it through the L3 to L7 service infrastructure.

The SSPs can be COTS-based servers or proprietary appliances that host the actual applications and services, and in a virtualized environment, on the Virtual Machines. When they are initially brought up, the services register directly with the SFR-C or through an external "Service Broker" which provides the information to the SFR-C function. The SFR-C informs the SFR-U function with the SSP that is associated with the newly instantiated service. Alternatively, the services could be discovered and registered using a protocol such as CDP or LLDP, or known to the SFR-C via configuration.

SSPs forward the outbound packets to the SFR-Us they are connected to on the ingress interface on the SFR-U, for the service the SSP represents. On receiving this packet, the SFR-U does a lookup on its flow table and forwards the packet to the next service's SSP or directly to the service devices where SSPs for that service do not exist, via the appropriate mechanism such as directly-connected interface, VLAN, tunnel, etc. For example, when the next SSP in the chain is on a VLAN, the SFR-U forwards the packet to the selected SSP by sending the packet to the VLAN the SSP is situated on with the MAC address of the SSP.

Where SSPs do not exist for a service, the SFR-U forwards the packet to the server or the appliance next in the service chain, directly without the need for an SSP. Where there are multiple SSPs for a service or where multiple servers exist for a service, the SFR-U also implements global load balancing under the direction of the SFR-C. The SFR-C using a combination of current load on the SSPs/servers/appliances, as well as in-band/out of band messaging from the service elements, programs the SFR-Us to send traffic to specific SSPs/servers/appliances on a per subscriber basis. Alternatively, the SFR-Us can receive credits from the SFR-C and make the decision to distribute traffic to the next service elements on a per subscriber basis, or any other basis as the deployment model demands.

In operation, the SFR architecture can reuse existing network elements (switches and routers via Policy Based Routing), to implement a distributed subscriber aware service steering that scales the control plane (e.g., L2-to-L4 and L4-to-L7 elements independently), global load balancing, L7 load balancing/proxies and CG-NAT. In certain example embodiments, the SFR-C is configured to provide the RAT type (WiFi, 3G, 4G) to the SFR-U and other network services elements. Since the traffic pattern on each RAT is different, network elements can provision and size bandwidth and resources based on RAT types, i.e., Traffic Engineering. Based on the RAT type, the amount of internal resources for functions (such as NAT, ADC, FW) could be provisioned accordingly. In a virtualized environment, this better helps in matching the traffic to the resources.

In addition, the SFR-C can provide the IMEI (Tablet, Smartphone, Dongle, Smart Meter, etc.) to the SFR-U, SFR-AD, and other network services elements. Since the traffic pattern for each IMEI type is different, network elements can provision and size bandwidth and resources based on IMEI types (i.e., traffic engineering). Based on the IMEI type, the amount of internal resources for functions (such as NAT, ADC, FW) could be provisioned accordingly. In a virtualized environment, this better helps in matching the traffic to the resources. The SFR-C also provides the RAT type (WiFi, 3G, 4G) to the SSP. Running in a virtualized environment, the SSP can load balance the target service (such as the video transrating function) executing on virtual machines based on the particular RAT type. Service providers can grow capacity with a better knowledge and assessment of resource demands based on individual RAT types. The SFR-C provides the IMEI type (WiFi, 3G, 4G) to the SSP. Running in a virtualized environment, the SSP can load balance the target service (such as the video transrating function) running on virtual machines based on the particular IMEI type. Service providers can grow capacity with a better knowledge and assessment of resource demands based on individual IMEI types.

In particular embodiments, such an architecture can provide a method to separate the control plane for traffic detection function from the bearer plane, while still providing a single point for billing and accounting. This can be done via accounting collation across the SFR-U nodes. The SFR-C can provide the time and filter attributes to the SSP that enables on-demand services. For example, a particular user (IMSI, IP address) can be enabled to access the provider services for a particular duration only and for a particular (provider-hosted or 3rd party) service only. This allows on-demand usage of devices such as tablets that are equipped with 3G/4G connectivity, but that are not commonly used. So, a user can connect to a particular service (or URLs) for a specified period of time. Such on-demand services could be added dynamically (e.g., based on an event such as Superbowl or Soccer Championship) in the service infrastructure.

In comparison to other potential alternatives, other architectures frequently operate based on containerization of disparate services, such as vEPC, NAT, Firewall, Video optimization, into user groups. Such flawed strategies require an instance of a ContextReam (with the in-bound front end, back end and out-bound front-end infrastructure) for every so many users (e.g., approximately 2000) since the solution is processing an I/O-bottlenecked. In contrast, the SFR solution discussed herein allows independent scale out of control plane function, L2-L4 bearer plane function and L7 services. Capacity can be added, for example, based on whether the demand is for I/O (L2-L4), number of subscribers (SFR-C), or one or more services (SSP) independently.

Figure 4:
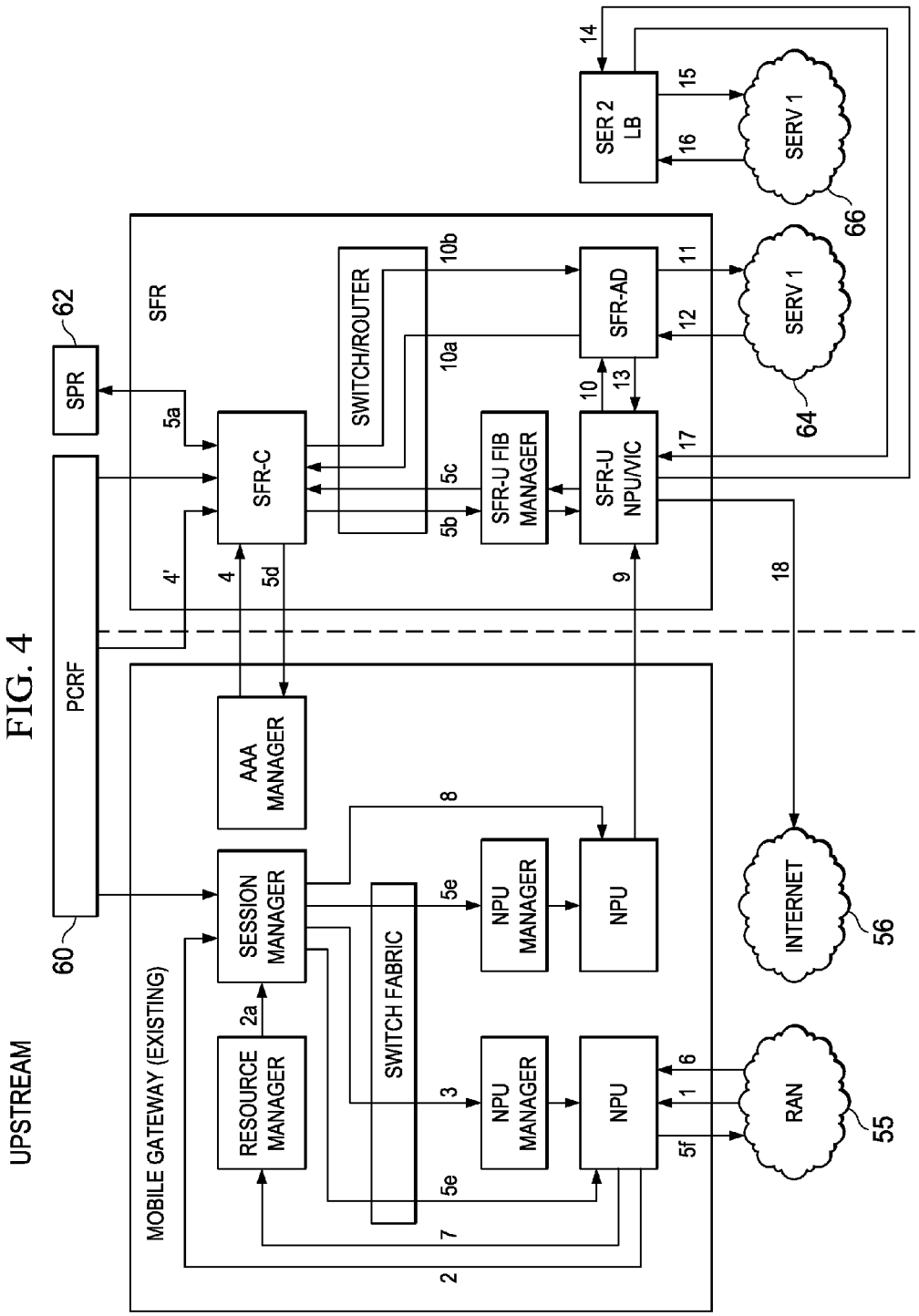
FIG. 4 is a simplified flowchart illustrating example upstream activities associated with the communication system.

FIG. 4 is a simplified block diagram illustrating a number of potential steps associated with various activities discussed herein. In the particular example of FIG. 4, the life of a packet in the upstream direction is being illustrated. In this particular architecture, a PCRF 60 is illustrated, along with an instance of a network processing unit (NPU), an NPU manager, an SPR 62, a RAN 55, an Internet 56, and a set of Serv1 instances 64, 66. This particular flow begins at RAN 55 and ends at Internet 56 (operations 1-18, as is being depicted). For upstream traffic service insertion and service chaining, the user equipment couples to an access network, the Upstream Traffic Ingress interface on SFR-U, then the Service 1 egress interface on SFR-U, then the Service 1 SSP/Service Equipment, then the Service 1 Ingress Interface on SFR-U, then the Service 2 egress interface on SFR-U, then the Service 2 SSP/Service Equipment, then the Service 2 Ingress Interface on SFR-U, etc. Then, the flow moves to the Service N−1 Ingress Interface on SFR-U, the Service N egress interface on SFR-U, the Service N SSP/Service Equipment, the Service N Ingress Interface on SFR-U, the external network egress interface, then the external network.

For downstream traffic service insertion and service chaining, the flow moves from the external network, Downstream Traffic Ingress interface on SFR-U, the Service N egress interface on SFR-U, the Service N SSP/Service Equipment, the Service N ingress interface on SFR-U, the Service N−1 egress interface on SFR-U, the Service N−1 SSP/Service Equipment, the Service N−1 ingress interface on SFR-U, etc. In addition, the flow can then move to the Service 1 egress interface SFR-U, the Service 1 SSP/Service Equipment, the Service 1 Ingress Interface on the SFR-U, the access network, and the user equipment. Hence, the upstream and downstream service insertion and chaining for each subscriber are independent and, further, could be completely different in services provided as well.

In addition, in certain embodiments of the proposed architecture, an MSP is able to control subscriber-specific flow management at the networking layer (up to L4) and the application layer (L4-L7) independently. This control is offered at a centralized node (SFR-C), which itself can be scaled out independently. The MSP can grow the user plane capacity for flows at the networking layer by adding SFR-U functions. The MSP can better make use of User Plane capacity across geography by independent of SFR-C location. The MSP can grow SFR-C capacity independently, possibly as a function of subscriber growth (as opposed to traffic growth for the SFR-U). The MSP can control the application layer services for application-level authentication, charging and other value-add functions such as Ad Insertion. The MSP can better serve content based on: a) User Tier (IMSI), b) Connectivity type (WiFi or 3G/4G, fixed broadband via RAT type), and c) Device Type (IMEI). This improves the user experience and also avoids wasting network resources. The MSP can grow application servers independently, and make use of the utility computing model, as opposed to the monolithic server farms in use today. The MSP can additionally co-locate NAT(44, 64) and ALG functions at the SFR-U as a centralized NAT.

For flow table management, in the context of upstream/downstream forwarding, routing/switching/forwarding from service network elements to the SFR can be done via routing/switching/forwarding using source IP or MAC or other forms of source address based routing/switching/forwarding at an aggregated source address level for upstream traffic, and destination IP or MAC or other forms of destination address based routing/switching/forwarding at an aggregated destination address level for downstream traffic. This enables user traffic from/to UEs to reach the SFR for service insertion and service chaining while not imposing undue forwarding table growth on network elements outside of SFR. SFR can additionally provide load balancing and proxy functions towards services and also provide NAT, 6 to 4, 4 to 6 and other application level gateway (ALG) services as a special functions.

While services may primarily be provided by equipment external to the SFR function in the services networks, nothing in this disclosure precludes services being integrated as part of the SFR function. Upstream subscriber traffic originates external to SFR from user equipment (UE). From UEs this traffic is brought into the access network by gateways/routers/switches or other access equipment which then forward the traffic to the SFR via source address based forwarding or default routing configuration or Service Tunnel/VPN for service insertion and service chaining. Such source address rules are based on IP pools served by the SFR-U to reduce flow table growth in network elements outside of the SFR.

In operation, a subscriber/user is allocated an IP address by the gateway device, it informs the SFR-C about the subscriber through some form of message or protocol. One such embodiment could be AAA start message or any custom message from the gateway to SFR-C. The gateway chooses specific SFR based on the IP address allocated to subscriber and SFR that services that IP address pool. Another embodiment could be configuration of the SFR based on prior knowledge of subscriber's service profiles and allocating UE IP address assignment from IP address pools based on service profiles. Yet another embodiment could be when the traffic with user source address is seen for the first time by the SFR-U and the SFR-U sends this information to the SFR-C. The SFR-C queries a subscriber/user database that can map source address to subscriber information, to retrieve the service profile for the user which provides the details of the services to be provided to the subscriber traffic, and/or the conditions which decide what services are to be provided on a per packet basis and/or the order in which the services are to be provided. Using this subscriber profile information, the SFR-C chooses an appropriate SFR-U and programs the data/user plane to handle the traffic for the subscriber appropriately via service flow forwarding tables.

When a subscriber session is terminated, the gateway device informs the SFR-C about subscriber IP address allocation termination via some form of message or protocol. One such embodiment could be a AAA stop message or any custom message from the gateway to the SFR-C. Other forms of termination of subscriber IP address allocation include configuration updates to the SFR-C or database pushes to the SFR-C or timeouts implemented on the SFR-C for an allocated subscriber address or the DHCP server sends an address revocation update to the SFR-C or the service profile database send a terminate message to the SFR-C. When an IP address is revoked from a subscriber, the subscriber service forwarding table entries that were created by the SFR-C on the appropriate SFR-U for that subscriber is deleted from the SFR-U.

When the upstream packets from subscribers are received by the SFR for processing, they are received on a specific interface on the SFR that is designated as the upstream traffic ingress interface. The packets are classified using hashes or keys made up of interfaces and source addresses primarily, and additionally any combination of destination IP/MAC addresses, TCP/UDP ports, protocols, physical ports or other parameters from either the header of the packet or the contents of the packet. Using the results of the hash or key, the next service destination interface is derived from the service flow forwarding table and the packet is forwarded to the appropriate egress service interface on the SFR. From the service interface, the subscriber packet reaches the service equipment or the load balancer or proxy for that service. Where there are multiple load balancers, proxies or servers exist for the same service, the SFR forwards the traffic from the same subscriber (using source address) or flow (using any combination of source address and destination address, port, protocol, etc.) to the same load balancer, proxy, or server.

Upstream packets returning from the service equipment are sent to the ingress service interface on the SFR for that service using source address pool based classification on the network equipment in the service routing/switching network. The previous step may be skipped if the service equipment is directly connected on the specific ingress service interface to the SFR. The incoming packets are classified using hashes or keys made up interfaces and source addresses primarily and additionally any combination of destination addresses, TCP/UDP ports, protocols, physical ports or other parameters from either the header of the packet or the contents of the packet. The results of this key or hash is used to lookup the next set of rules in the service forwarding table and the packet is forwarded to the next service interface on the SFR for forwarding to the appropriate next service. This process is repeated until the services for the subscriber packet flow is completed and the packet is forwarded to its intended destination using destination based routing as the last step. The packet is sent out via the upstream egress interface. The network routing/switching domain beyond the SFR upstream egress exit points are configured to do only destination based forwarding and not source based forwarding.

Figure 5:
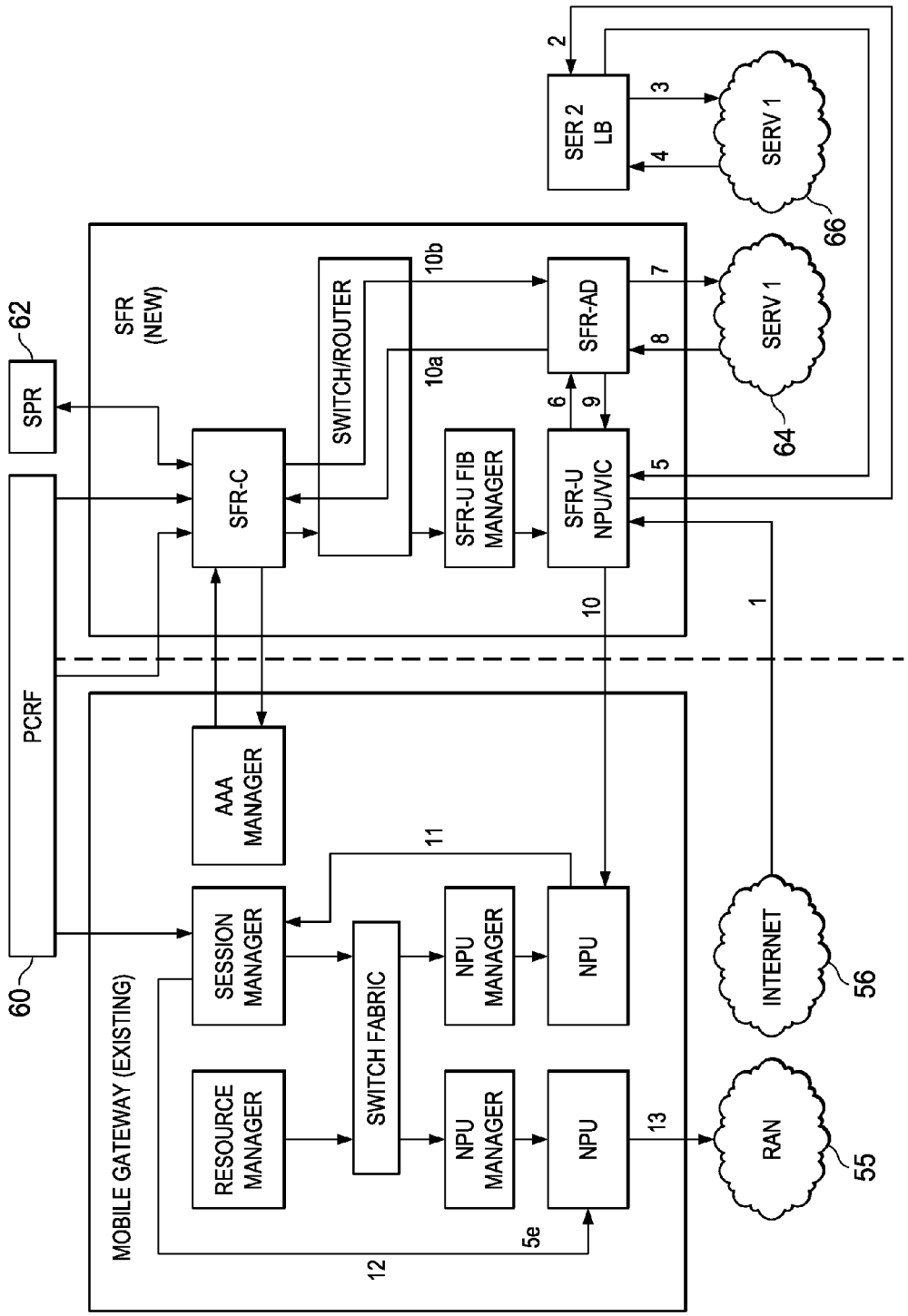
FIG. 5 is a simplified flowchart illustrating example downstream activities associated with the communication system.

FIG. 5 is a simplified block diagram illustrating a number of potential steps associated with various activities discussed herein. In the particular example of FIG. 5, the life of a packet in the downstream direction is being illustrated. This particular flow begins at Internet 56 and ends at RAN 55 (operations 1-13, as is being depicted). When the downstream packets to the UEs are received by the SFR for processing, they are received on a specific interface on the SFR, which is designated as the downstream traffic ingress interface. The packets are classified using hashes or keys made up of interfaces and destination addresses primarily, and additionally any combination of source IP/MAC addresses, TCP/UDP ports, protocols, physical ports, or other parameters from either the header of the packet or the contents of the packet. Using the results of the hash or key, the next service destination interface is derived from the service forwarding table, and the packet is forwarded to the appropriate service interface on the SFR. From the service interface, the downstream packet reaches the service equipment, the load balancer, or proxy for that service. Where there are multiple load balancers, proxies, or servers that exist for the same service, the SFR forwards traffic from the same subscriber (using destination address) or flow (using any combination of destination address and source address, port, protocol, etc.) to the same load balancer, proxy, or server.

Downstream packets returning from the service equipment are sent to the ingress service interface on the SFR for that service using destination address pool based classification on the network equipment in the service routing/switching network. The previous step may be skipped if the service equipment is directly connected to the SFR on the ingress service interface for that service. The incoming packets are classified using hashes or keys made up interfaces and destination addresses primarily and additionally any combination of source addresses, TCP/UDP ports, protocols, physical ports or other parameters from either the header of the packet or the contents of the packet. The results of this key/hash is used to lookup the next set of rules in the service forwarding table and the packet is forwarded to the next service interface on the SFR for forwarding to the appropriate next service. This process is repeated until the services for the subscriber packet flow is completed and the packet is forwarded to its intended UE destination using destination based routing as the last step. The packet is sent out via the downstream egress interface.

For user-to-user communication, player the packet flow is between two endpoints represented by the same IP address pool, or IP address pool served by the same SFR-U, the SFR recognizes that source and destination address belong either to the same address pool or address pools serviced by it and uses NAT to separate the upstream and downstream flows in either direction. The SFR owns private NAT address pools, the reachability for which are propagated into the services network via routing protocols or configuration of the services network devices. The services network equipment is configured to forward packets from the services equipment where the destination address is from the private NAT pool to the SFR-U and no action is taken when the source address is from the NAT from the NAT pool.

For upstream flows from UE1 to UE2, where UE1 and UE2 belong the same IP address pool or IP address pools served by the same SFR-U, the SFR swaps out the destination address to an address from the private NAT pool, and process the packets through the services chain based on UE1 as the source address. On reaching the end of service chain processing, the SFR now swaps back the destination address from NAT address to UE2 address, and changes the source address of UE1 to an address from the private NAT address pool. The SFR then initiates service chain processing for services that are appropriate for the downstream services processing for UE2 as destination address. At the end of the downstream service chain processing for UE2 as destination address, the SFR would swap out the private NAT address assigned to the source address with UE1's address and forward the packet to the UE2 downstream egress interface.

When UE2 sends traffic to UE1, the above process is repeated but with UE1 destination address being initially swapped out for the private NAT pool, processing the packet through the service chain and at the end of the service chain processing, swap out the NAT address from the destination address with UE1s address and swap the source address of UE2 with the NAT address, and send it through the UE1 downstream service processing chain. At the end of the service processing, the SFR swaps out the NAT address in the source address of the packet header with UE1's address and forwards the packet to UE1's downstream egress interface.

For geographically separated SFR-U functions, when services for the same subscriber are located in geographically different locations or datacenters or locations separated by a bandwidth and/or delay constrained network such as wide area networks (WANs), the SFR-U function can be replicated across each individual location to prevent tromboning of subscriber traffic across the WAN when subscriber traffic is routed from one service to the next. The SFR-Us in multiple locations can be connected with each other using tunnels such as VLANs, GRE tunnels, VPLS, MPLS, etc., where each tunnel represents a service. The SFR-U interfaces at these SFR-U to SFR-U tunnel endpoints and can be considered as egress and ingress interfaces for the services depending on the direction of traffic flow. Since service network elements at each location forward traffic to the local SFR-U on the appropriate ingress interfaces, and the SFR-U forwards traffic to the appropriate local service egress interfaces, the SFR-Us can be replicated across service network locations for the same address pools serviced without any issues.

Alternatively, the SFR-U to SFR-U connections can be implemented using proprietary headers to encapsulate the subscriber packet, where the proprietary header indicates either the next service to be chained on the receiving SFR-U or the prior service where the packet originated at the originating SFR-U or both. Using this proprietary header information, the receiving SFR-U can forward the packet to the appropriate next service for service chaining. Where no subscriber specific service flow table exists, the SFR-U shall operate in regular destination address based forwarding mode.

In terms of the infrastructure of the present disclosure, UEs (generally indicated at an arrow 28 of FIG. 1) can be associated with clients, customers, endpoints, handheld devices, or end users wishing to initiate a communication in communication system 10 via some network. The term 'UE' and the term 'mobile device' are inclusive of devices used to initiate a communication, such as a receiver, a computer, a router, a gateway, a network appliance, a proprietary device, a set-top box, an Internet radio device (IRD), a cell phone, a smartphone of any kind, a tablet (e.g., a Microsoft Surface, a Google Nexus, etc.), a personal digital assistant (PDA), an iPhone, an iPad, a Google Droid, or any other device, component, element, or object capable of initiating voice, audio, video, media, or data exchanges within communication system 10. The UEs may also be inclusive of a suitable interface to the human user, such as a display, a keyboard, a touchpad, a remote control, or other terminal equipment. UEs may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

The WAPs can be configured to connect one or more UEs to a network (e.g., a WiFi network). WAPs may resemble a network hub, relaying data between connected wireless devices (e.g., UEs) in addition to a connected wired device (e.g., an Ethernet hub or switch). This allows wireless devices to communicate with other wired and wireless devices. Networks of the present disclosure represent a series of points or nodes of interconnected communication paths for receiving and transmitting packets of information that propagate through the architecture. Each network can offer a communicative interface between sources and/or hosts, and each may be any LAN, WLAN metropolitan area network (MAN), Intranet, Extranet, wide area network (WAN), virtual private network (VPN), or any other appropriate architecture or system that facilitates communications in a network environment. The architecture of the present disclosure may include a configuration capable of transmission control protocol/internet protocol (TCP/IP) communications for the transmission and/or reception of packets in a network. The architecture of the present disclosure may also operate in conjunction with a user datagram protocol/IP (UDP/IP) or any other suitable protocol, where appropriate and based on particular needs.

The PCRF may be configured to determine policy rules in real-time in a multimedia network. The PCRF can operate at a network core and access subscriber databases and other specialized functions, such as charging systems, in a scalable and centralized manner. The PCRF is the part of the network architecture that aggregates information to and from the network, operational support systems, and other sources (such as portals) in real time, supporting the creation of rules and then making policy decisions for each UE active on the network. AAA nodes in the network may provide authentication, authorization, and accounting for UEs accessing and using communication system 10. The HSS may provide management of a centralized subscriber database of UEs accessing and using communication system 10.

In terms of the infrastructure configured to perform the significant activities discussed herein, instances of SFR 20 and SSP HTTP VMs 26 are network elements that can facilitate many of the processing, intelligent subscriber-specific service insertion, and/or service chaining protocol activities discussed herein. As used herein in this Specification, the term 'network element' is meant to encompass any of the aforementioned elements, as well as routers, switches, cable boxes, gateways, bridges, loadbalancers, firewalls, inline service nodes, proxies, servers, processors, modules, or any other suitable device, component, element, proprietary appliance, user equipment, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, SFR 20 and/or SSP HTTP VMs 26 includes software to achieve (or to foster) the processing, intelligent subscriber-specific service insertion, and/or service chaining protocol activities discussed herein. This could include the implementation of instances of various software modules (e.g., SFR-C, SFR u-plane, etc.) to perform these activities. Additionally, any of the elements of FIG. 1 can have an internal structure (e.g., a processor, a memory element, etc.) to facilitate some of the operations described herein. In other embodiments, these outlined activities may be executed externally to these elements, or included in some other network element to achieve the intended functionality. Alternatively, SFR 20 and/or SSP HTTP VMs 26 may include software (or reciprocating software) that can coordinate with other network elements in order to achieve the activities described herein. In still other embodiments, one or several devices may include any suitable algorithms, hardware, software, components, modules, interfaces, or objects that facilitate the operations thereof.

In certain example implementations, the processing, intelligent subscriber-specific service insertion, and/or service chaining protocol activities functions outlined herein may be implemented by logic encoded in one or more non-transitory tangible media (e.g., embedded logic provided in an application specific integrated circuit [ASIC], digital signal processor [DSP] instructions, software [potentially inclusive of object code and source code] to be executed by a processor [processor 45 shown in FIG. 1], or other similar machine, etc.). In some of these instances, a memory element [memory element 49 shown in FIG. 1] can store data used for the operations described herein. This includes the memory element being able to store instructions (e.g., software, logic, code, etc.) that are executed to carry out the activities described in this Specification. The processor (e.g., processor 45) can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the processing, intelligent subscriber-specific service insertion, and/or service chaining protocol activities as outlined herein. Additionally, each of these devices may include a processor that can execute software or an algorithm to perform the processing, intelligent subscriber-specific service insertion, and/or service chaining protocol activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and, further, can accommodate a large number of components, as well as more complicated/sophisticated arrangements and configurations. Accordingly, the examples provided should not limit the scope or inhibit the broad teachings of communication system 10, as potentially applied to a myriad of other architectures.

It is also important to note that the steps in the preceding FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   programming a selected service flow router user plane element corresponding to a subscriber's session at a subscriber termination function;
   steering subscriber traffic to a first service element of an ordered list of a plurality of services;
   receiving an IP packet from the first service element;
   forwarding the IP packet to a next service element in the ordered list, wherein the first service element and the next service element provide services at a layer between L4 to L7;
   sending a message to the selected service flow router user plane element, after a termination of the subscriber's session at the subscriber termination function; and
   receiving from the selected service flow router user plane element accounting records in acknowledgement, wherein the accounting records are for the plurality of services.

2. The method of claim 1, wherein the selected service flow router user plane element determines an Internet protocol (IP) address for a plurality of service elements for steering the subscriber traffic based on load conditions at the plurality of service elements.

3. The method of claim 1, wherein the selected service flow router user plane element forwards packets for the subscriber's session to a specific next-hop service element such that the subscriber traffic is not forwarded to an Internet or to another service network.

4. The method of claim 1, wherein the selected service flow router user plane element applies bandwidth limiting for the plurality of services in the ordered list.

5. The method of claim 1, wherein the selected service flow router user plane element exports accounting records for steered services with a timestamp.

6. The method of claim 1, wherein the selected service flow router user plane element applies bandwidth limiting for the plurality of services in the ordered list, based on a radio access type or an International Mobile Station Equipment Identity type.

7. The method of claim 1, wherein the selected service flow router user plane element removes a subscriber state after the termination of the subscriber's session.

8. The method of claim 7, wherein the selected service flow router user plane element stops forwarding packets for an identified IP address for the subscriber's session after removal of the subscriber state.

9. The method of claim 1, further comprising:
   discovering and registering services using a link layer discovery protocol or a Cisco discovery protocol, wherein the selected service flow router user plane element is programmed in response to receiving an indication of an establishment of the subscriber's session at the subscriber termination function.

10. The method of claim 1, wherein upstream subscriber traffic is steered through a first ordered list of a first plurality of services and downstream subscriber traffic is steered through a second ordered list of a second plurality of services, the second ordered list being different from the first ordered list.

11. The method of claim 1, wherein the programming the selected service flow router user plane element comprises specifying the ordered list of the plurality of services in a flow table of the selected service flow router user plane element.

12. The method of claim 1, further comprising:
    obtaining information indicating availability of services in a network environment from respective commercial-off-the-shelf (COTS) servers and/or proprietary appliances that provide the plurality of services as the plurality of services become available, wherein each service of the plurality of services is provided by a respective COTS server or a proprietary appliance.

13. The method of claim 1, further comprising:
    sending a message to a subscriber service proxy to delete an L4 to L7 flow state.

14. The method of claim 1, further comprising:
    receiving a Radio Access Type, if a subscriber changes an access network.

15. The method of claim 1, further comprising:
    receiving registration information of an application from a subscriber service proxy, the registration information describing a service and including an IP address.

16. The method of claim 14, further comprising:
    providing the Radio Access Type to a subscriber service proxy.

17. Logic encoded in non-transitory media that includes code for execution and, when executed by a processor, operable to perform operations comprising:
    programming a selected service flow router user plane element corresponding to a subscriber's session at a subscriber termination function;
    steering subscriber traffic to a first service element of an ordered list of a plurality of services;
    receiving an IP packet from the first service element;
    forwarding the IP packet to a next service element in the ordered list, wherein the first service element and the next service element provide services at a layer between L4 to L7;
    sending a message to the selected service flow router user plane element, after a termination of the subscriber's session at the subscriber termination function; and
    receiving from the selected service flow router user plane element accounting records in acknowledgement, wherein the accounting records are for the plurality of services.

18. The logic of claim 17, wherein the selected service flow router user plane element determines an Internet protocol (IP) address for a plurality of service elements for steering the subscriber traffic based on load conditions at the plurality of service elements.

19. The logic of claim 17, wherein the selected service flow router user plane element forwards incoming IP packets to the first service element in the ordered list using a layer-2 (L2) or a layer-3 (L3) technology.

20. A network element, comprising:
    a memory element; and
    a processor operable to execute instructions such that the network element is configured to program a selected service flow router user plane element corresponding to a subscriber's session at a subscriber termination function, steer subscriber traffic to a first service element of an ordered list of a plurality of services, receive an IP packet from the first service element, forward the IP packet to a next service element in the ordered list, wherein the first service element and the next service element provide services at a layer between L4 to L7;

send a message to the selected service flow router user plane element, after a termination of the subscriber's session at the subscriber termination function; and receive from the selected service flow router user plane element accounting records in acknowledgement, wherein the accounting records are for the plurality of services.

21. The network element of claim 20, wherein the selected service flow router user plane element determines an Internet protocol (IP) address for a plurality of service elements for steering the subscriber traffic based on load conditions at the plurality of service elements.

* * * * *